A. B. COREY.
MOLD FOR MAKING WARP DRESSER GUIDES OF GLASS.
No. 21,487. Patented Sept. 14, 1858.
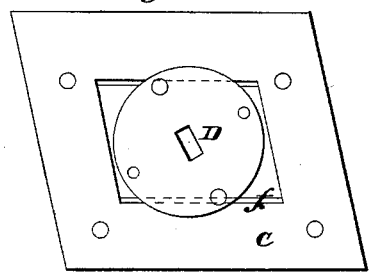
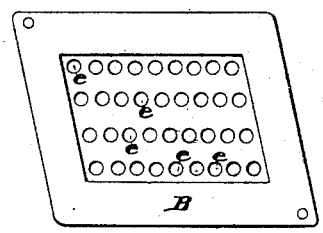
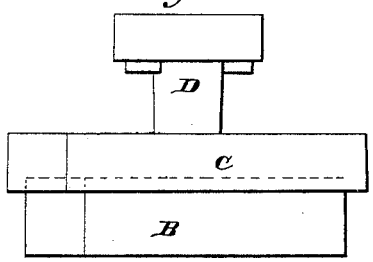
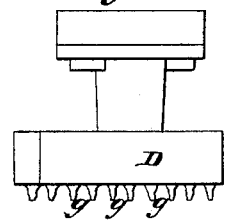
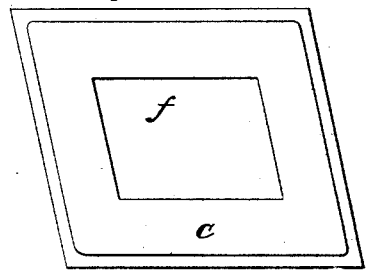
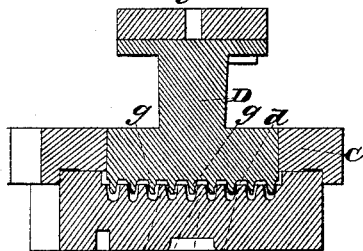
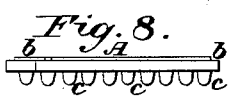
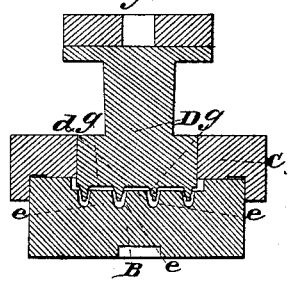

UNITED STATES PATENT OFFICE.

ALFRED B. COREY, OF FRANKLIN, CONNECTICUT.

MOLD FOR MAKING WARP-DRESSER GUIDES OF GLASS OR OTHER PLASTIC ANTICORROSIVE MATERIAL.

Specification of Letters Patent No. 21,487, dated September 14, 1858.

*To all whom it may concern:*

Be it known that I, ALFRED B. COREY, of Franklin, in the county of New London and State of Connecticut, have invented a new and useful Mold for Manufacturing Warp-Dresser Guides of Glass or a Plastic Material Capable, when in an Indurated State, of Resisting Acids; and I do hereby declare that the same is fully described and represented in the following specification and the accompanying drawings, of which—

Figure 1 is a top view; Fig. 2, a side elevation; Fig. 3, a longitudinal section and Fig. 4, a transverse section of the said mold. Fig. 5 is a top view of its bed plate. Fig. 6 is a side view of its plunger and the cores thereof, while Fig. 7 is an under side view of the "removable plunger guide". Fig. 8, is a front view, and Fig. 9, a transverse section of one of the articles made by such mold. Fig. 10 is a longitudinal section of the said article or warp dresser guide in a finished state, or as it appears after its series of hollow tapering nipples or projections are ground off or removed.

The peculiar object of my invention is to enable a warp dresser guide to be molded of glass and with very smooth eyes or yarn holes.

The common mode of making the guides of warp dressing machines has been to construct them of a copper or metallic plate having holes bored or punctured therein. The great objection to the metallic guide plate is to be found in its liability to oxidation and wear while in use. In consequence of the sizing or dressing material being generally more or less acid the holes of the guide plates while the warp threads are being drawn through them are soon cut, worn and eaten down so as materially to affect the correct operations of the machine as well as to injure the yarn. It is very essential to have each guide hole possess a very smooth bore or inner surface and that such should maintain a cylindrical or conical form as long as possible. For this purpose I make the guide plates of glass, porcelain or some proper mineral plastic substitute capable of not only resisting acids as well as wear by the passage of the yarns through its guide holes but of being molded with very smooth surfaces, particularly those of the guide holes.

In Figs. 8, 9 and 10 the guide plate is exhibited at A, as formed with a series of tapering guide holes *a*, *a*, and with flanges *b*, *b*, the latter being made to extend from its top and bottom edges, as shown in said drawings. Furthermore in Fig. 9, the guide blank is represented as formed with a series of tapering nipples or projections *c*, *c*, each of which extend beyond the plate or body of the guide and axially with respect to one of the guide holes. After the blank has been so made these nipples or projections are ground off. The object of the flanges is to enable the guide to enter and be secured in a suitable frame.

The mold for making the article above mentioned consists, first, of a bed plate B, constructed with a shallow recess, trough or body and flange matrix *d*, having the form of a parallelogram in horizontal section or being made with its opposite sides parallel, and with a series of plunger cavities *e*, *e*, extending downward from it. Second, of a removable plunger guide C, which consists of a block recesses on its under side, so as to receive and fit upon the bed plate and to have a chamber *f*, for the reception and guiding of the plunger D. The opposite sides of the chamber *f*, are arranged at a less distance apart from one another than are those of the body and flange matrix *d*, the same being to enable the flanges to be formed on the guide plate. Third, of a plunger D, adapted to fit and slide in the chamber *f*, and provided with a series of tapering projections or conical cores *g*, *g*, each of which is to be constructed with a very smooth or polished external surface and to project downward from the plunger so as to be capable of entering one of the cavities of the bed plate when the plunger is depressed within the mold or the chamber *f*, of the removable guide. I would here observe that each of the cavities of the bed plate does not entirely extend through the same so as to form a hole through the said plate, for were such the case the molten glass during the act of depressing the plunger would be expelled from or driven out of the mold, and could not be properly condensed about the surfaces of each of the cores.

In operating with this mold, if when the plunger is out of the same we pour into the chamber of the plunger guide a quantity of molten glass and next insert the plunger in the said chamber and force it downward therein the glass will be caused to spread outward and fill the body and flange matrix as well as the plunger cavities of the bed plate. At the same time the cores of the plunger will pass into the mass of glass, which will be made to assume the form indicated in Figs. 8 and 9.

I do not claim a mold or press in which the plunger is furnished with a series of projections and the bottom plate of the plunger chamber is perforated with holes to receive such projections respectively, as I am aware that such is the construction of machines or presses for making macaroni or at one and the same time several pipes. My invention is for another purpose and differs from the above in one important particular, especially in having no holes through its bed, but in place thereof simple tapering cavities each of which is closed at bottom and open at top, such causing a glass plate when made by the mold to have a series of hollow tapering nipples or projections extending from one face of it.

The object of making the plunger guide removable from the base plate is to enable a molded article to be removed from the mold and furthermore the said plunger guide serves not only to hold the article in the mold while the plunger is being drawn from the article, but to guide the plunger in its descent and to form a surplus chamber into which the glass may be spread by the plunger. The most experienced workman can not always pour into the mold a like quantity of material as the quantity will vary a little in every casting; hence the necessity of the surplus chamber.

What I claim is—

My improved mold as made with plunger cavities $e$, $e$, $e$, of the kind described in its bed-plate B, a body or body and flange matrix, $d$, a removable plunger guide C, or its equivalent, and a plunger D, provided with a series of projections or cores $g$, $g$, the whole being combined and arranged substantially in manner and for the purpose as described.

In testimony whereof I have hereunto set my signature this 12th day of August 1858.

ALFRED B. COREY.

Witnesses:
R. H. EDDY,
F. P. HALE, Jr.